(12) United States Patent
Lokshin et al.

(10) Patent No.: US 7,835,863 B2
(45) Date of Patent: Nov. 16, 2010

(54) METHOD AND SYSTEM FOR NAVIGATION USING GPS VELOCITY VECTOR

(75) Inventors: Anatole Lokshin, Huntington Beach, CA (US); Victor Kulik, Claremont, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 881 days.

(21) Appl. No.: 11/737,125

(22) Filed: Apr. 18, 2007

(65) Prior Publication Data

US 2008/0262728 A1    Oct. 23, 2008

(51) Int. Cl.
*G01S 5/14* (2006.01)
*G01C 21/00* (2006.01)

(52) U.S. Cl. .................. 701/213; 701/211; 342/357.12

(58) Field of Classification Search .............. 701/213, 701/200, 209, 211; 342/357.12, 357.04, 342/257.06
See application file for complete search history.

(56) References Cited

U.S. PATENT DOCUMENTS

| | | | |
|---|---|---|---|
| 5,515,283 | A | 5/1996 | Desai et al. |
| 5,802,492 | A | 9/1998 | DeLorme et al. |
| 5,862,511 | A | 1/1999 | Croyle et al. |
| 6,225,945 | B1 * | 5/2001 | Loomis .................. 342/357.12 |
| 6,275,185 | B1 * | 8/2001 | Loomis .................. 342/357.14 |
| 6,542,814 | B2 | 4/2003 | Polidi et al. |
| 6,609,062 | B2 | 8/2003 | Hancock |
| 6,728,608 | B2 | 4/2004 | Ollis et al. |
| 6,782,319 | B1 | 8/2004 | McDonough |
| 7,343,242 | B2 | 3/2008 | Breitenberger et al. |
| 7,353,107 | B2 | 4/2008 | Breitenberger et al. |
| 7,379,812 | B2 | 5/2008 | Yoshioka et al. |

(Continued)

FOREIGN PATENT DOCUMENTS

JP    07286856 A    10/1995

(Continued)

OTHER PUBLICATIONS

International Patent Application No. PCT/US2008/084659, Written Opinion and International Search Report, Apr. 28, 2009.

(Continued)

*Primary Examiner*—Tan Q Nguyen
(74) *Attorney, Agent, or Firm*—Winston Hsu; Scott Margo (57) ABSTRACT

A navigation device includes a computer platform that includes a global positioning system (GPS) receiver operable to acquire and track a GPS signal, a processor assembly, and a memory. The memory includes at least one of last recorded Ephemeris and Almanac information, and a GPS velocity vector determination module operable to generate a velocity vector output in the absence of current Ephemeris based upon the tracked GPS signal and the last recorded GPS information. A method of vehicle navigation in the absence of current Ephemeris includes acquiring and tracking a GPS signal, retrieving from a memory a last recorded location of a vehicle, setting a dead reckoning startup location equal to the last recorded location, retrieving from a memory at least one of a last recorded Ephemeris and Almanac, determining a current velocity vector and determining a current location based upon the velocity vector and the dead reckoning startup location.

10 Claims, 7 Drawing Sheets

U.S. PATENT DOCUMENTS

| | | | |
|---|---|---|---|
| 7,512,487 B1* | 3/2009 | Golding et al. | 701/202 |
| 7,546,202 B2 | 6/2009 | Oh | |
| 7,590,490 B2 | 9/2009 | Clark | |
| 2001/0018628 A1 | 8/2001 | Jenkins et al. | |
| 2002/0151315 A1 | 10/2002 | Hendrey | |
| 2003/0036842 A1 | 2/2003 | Hancock | |
| 2003/0036848 A1 | 2/2003 | Sheha et al. | |
| 2003/0167120 A1 | 9/2003 | Kawasaki | |
| 2003/0182052 A1 | 9/2003 | DeLorme et al. | |
| 2003/0191578 A1 | 10/2003 | Paulauskas et al. | |
| 2004/0263386 A1* | 12/2004 | King et al. | 342/357.06 |
| 2005/0107948 A1 | 5/2005 | Catalinotto | |
| 2006/0080031 A1 | 4/2006 | Cooper et al. | |
| 2006/0089788 A1 | 4/2006 | Laverty | |
| 2006/0106534 A1 | 5/2006 | Kawamata et al. | |
| 2006/0212217 A1 | 9/2006 | Sheha et al. | |
| 2006/0265422 A1 | 11/2006 | Ando et al. | |
| 2007/0027628 A1 | 2/2007 | Geelen | |
| 2007/0073480 A1 | 3/2007 | Singh | |
| 2007/0088494 A1 | 4/2007 | Rothman et al. | |
| 2007/0130153 A1 | 6/2007 | Nachman et al. | |
| 2007/0204218 A1 | 8/2007 | Weber et al. | |
| 2007/0213929 A1 | 9/2007 | Tanizaki et al. | |
| 2007/0233384 A1 | 10/2007 | Lee et al. | |
| 2008/0076451 A1 | 3/2008 | Sheha et al. | |
| 2008/0125958 A1 | 5/2008 | Boss et al. | |
| 2008/0133120 A1 | 6/2008 | Romanick | |
| 2008/0134088 A1 | 6/2008 | Tse et al. | |
| 2008/0177470 A1 | 7/2008 | Sutardja | |
| 2008/0270016 A1 | 10/2008 | Proietty et al. | |
| 2009/0138190 A1 | 5/2009 | Kulik | |
| 2009/0150064 A1 | 6/2009 | Geelen | |
| 2009/0171584 A1 | 7/2009 | Liu | |
| 2009/0182498 A1 | 7/2009 | Seymour | |
| 2009/0182500 A1 | 7/2009 | Dicke | |
| 2009/0187340 A1 | 7/2009 | Vavrus | |
| 2009/0187341 A1 | 7/2009 | Vavrus | |
| 2009/0187342 A1 | 7/2009 | Vavrus | |

FOREIGN PATENT DOCUMENTS

| | | | |
|---|---|---|---|
| JP | 2001194172 | | 7/2001 |
| JP | 2002048574 | | 2/2002 |
| JP | 2006250875 | | 9/2006 |
| JP | 2007155582 | | 6/2007 |
| JP | 2007178182 | | 7/2007 |
| JP | 2008002978 | | 1/2008 |
| KR | 19990011004 | | 2/1999 |
| KR | 19990040849 | | 6/1999 |
| KR | 20020084716 | | 11/2002 |
| KR | 20040033181 | A | 4/2004 |
| KR | 20040106688 | | 12/2004 |
| KR | 20050068971 | A | 7/2005 |
| KR | 20050116855 | A | 12/2005 |
| KR | 20070080726 | | 8/2007 |

OTHER PUBLICATIONS

International Patent Application No. PCT/US2009/030177, Written Opinion and International Search Report, Apr. 29, 2009.
International Patent Application No. PCT/US2009/030314, Written Opinion and International Search Report, May 25, 2009.
Shamir, Adi et al., "Playing 'Hide and Seek' with Stored Keys," Lecture Notes in Computer Science, vol. 1648, 1991, pp. 118-124.
Transaction History of related U.S. Appl. No. 08/691,663, filed Aug. 2, 1996, entitled "Method Providing A Textual Description of a Remote Vehicle Location," now U.S. Patent No. 6,141,621.
Transaction History of related U.S. Appl. No. 08/691,727, filed Aug. 2, 1996, entitled "System and Method for Controlling a Vehicle Emergency Response Network," now U.S. Patent No. 6,539,301.
Transaction History of related U.S. Appl. No. 08/710,473, filed Sep. 18, 1996, entitled "Navigation Simulator and Recorder," now U.S. Patent No. 5,922,041.
Transaction History of related U.S. Appl. No. 08/713,625, filed Sep. 13, 1996, entitled "Navigation System With Vehicle Service Information," now U.S. Patent No. 5,819,201.
Transaction History of related U.S. Appl. No. 08/713,627, filed Sep. 13, 1996, entitled "Navigation System With User Definable Cost Values," now U.S. Patent No. 5,878,368.
Transaction History of related U.S. Appl. No. 08/762,012, filed Dec. 11, 1996, entitled "Navigation System With Forward Looking Origin Selection for Route Re-Calculation," now U.S. Patent No. 6,405,130.
Transaction History of related U.S. Appl. No. 09/037,772, filed Mar. 10, 1998, entitled "Navigation System Character Input Device," now U.S. Patent No. 6,037,942.
Transaction History of related U.S. Appl. No. 09/056,218, filed Apr. 7, 1998, entitled "Navigation System using Position Network for Map Matching," now U.S. Patent No. 6,108,603.
Transaction History of related U.S. Appl. No. 09/062,518, filed Apr. 17, 1998, entitled "3-Dimensional Intersection Display for Vehicle Navigation System," now U.S. Patent No. 6,611,753.
Transaction History of related U.S. Appl. No. 09/096,103, filed Jun. 11, 1998, entitled "Navigation System With a Route Exclusion List System," now U.S. Patent No. 6,362,751.
Transaction History of related U.S. Appl. No. 09/099,963, filed Jun. 19, 1998, entitled "Autoscaling of Recommended Route," now U.S. Patent No. 6,574,551.
Transaction History of related U.S. Appl. No. 09/100,683, filed Jun. 19, 1998, entitled "Navigation System Map Panning Directional Indicator," now U.S. Patent No. 6,175,801.
Transaction History of related U.S. Appl. No. 09/114,670, filed Jul. 13, 1998, entitled "Navigation System Vehicle Location Display," now U.S. Patent No. 6,049,755.
Transaction History of related U.S. Appl. No. 09/118,030, filed Jul. 17, 1998, entitled "Navigation System With Predetermined Indication of Next Maneuver," now U.S. Patent No. 6,078,684.
Transaction History of related U.S. Appl. No. 09/160,068, filed Sep. 24, 1998, entitled "Navigation System With Anti-Alias Map Display," now U.S. Patent No. 6,163,269.
Transaction History of related U.S. Appl. No. 09/176,630, filed Oct. 22, 1998, entitled "Street Identification for a Map Zoom of a Navigation System," now U.S. Patent No. 6,178,380.
Transaction History of related U.S. Appl. No. 09/239,692, filed Jan. 29, 1999, entitled "Vehicle Navigation System With Location Based Multi-Media Annotation," now U.S. Patent No. 6,360,167.
Transaction History of related U.S. Appl. No. 09/418,749, filed Oct. 15, 1999, entitled "Navigation System With Road Condition Sampling," now U.S. Patent No. 6,484,089.
Transaction History of related U.S. Appl. No. 09/435,381, filed Nov. 5, 1999, entitled "Navigation System Character Input Device," now U.S. Patent No. 6,765,554.
Transaction History of related U.S. Appl. No. 09/470,438, filed Dec. 22, 1999, entitled "Navigation System With All Character Support," now U.S. Patent No. 6,256,029.
Transaction History of related U.S. Appl. No. 09/470,441, filed Dec. 22, 1999, entitled "Navigation System With Unique Audio Tones for Maneuver Notification," now U.S. Patent No. 6,363,322.
Transaction History of related U.S. Appl. No. 09/487,654, filed Jan. 19, 2000, entitled "Navigation System With Route Indicators," now U.S. Patent No. 6,430,501.
Transaction History of related U.S. Appl. No. 09/519,143, filed Mar. 6, 2000, entitled "Navigation System With Complex Maneuver Instruction," now U.S. Patent No. 6,397,145.
Transaction History of related U.S. Appl. No. 09/535,733, filed Mar. 27, 2000, entitled "Selective Rendering of Cartographic Entities for Navigation System," now U.S. Patent No. 7,170,518.
Transaction History of related U.S. Appl. No. 09/547,004, filed Apr. 11, 2000, entitled "Navigation System With Zoomed Maneuver Instruction," now U.S. Patent No. 6,529,822.
Transaction History of related U.S. Appl. No. 09/661,982, filed Sep. 18, 2000, entitled "Points of Interest for Navigation System," now U.S. Patent No. 6,374,180.

Transaction History of related U.S. Appl. No. 09/679,671, filed Oct. 5, 2000, entitled "Navigation System With Run-Time Training Instruction," now abandoned.
Transaction History of related U.S. Appl. No. 09/691,531, filed Oct. 18, 2000, entitled "Multiple Configurations for a Vehicle Navigation System," now U.S. Patent No. 6,385,542.
Transaction History of related U.S. Appl. No. 09/799,876, filed Mar. 6, 2001, entitled "Navigation System With Figure of Merit Determination," now U.S. Patent No. 6,741,928.
Transaction History of related U.S. Appl. No. 10/088,017, filed Sep. 9, 2002, entitled "Navigation System With User Interface," now U.S. Patent No. 6,873,907.
Transaction History of related U.S. Appl. No. 10/208,261, filed Jul. 31, 2002, entitled "Displaying Data," now U.S. Patent No. 6,748,323.
Transaction History of related U.S. Appl. No. 10/619,619, filed Jul. 16, 2003, entitled "Intelligent Modular Navigation Information Capability," now U.S. Patent No. 7,233,860.
Transaction History of related U.S. Appl. No. 11/327,450, filed Jan. 9, 2006, entitled "Smart Detour."
Transaction History of related U.S. Appl. No. 11/518,205, filed Sep. 11, 2006, entitled "Method and System of Securing Content and Destination of Digital Download Via the Internet."
Transaction History of related U.S. Appl. No. 11/675,817, filed Feb. 16, 2007, entitled "A Method of Generating Curved Baseline for Map Labeling."
Transaction History of related U.S. Appl. No. 11/684,301, filed Mar. 9, 2007, entitled "Method and Apparatus for Determining a Route Having an Estimated Minimum Fuel Usage for a Vehicle."
Transaction History of related U.S. Appl. No. 11/740,280, filed Apr. 25, 2007, entitled "Adjusting Spatial Operations Based on Map Density."
Transaction History of related U.S. Appl. No. 11/840,610, filed Aug. 17, 2007, entitled "Methods and Apparatus for Measuring the Effectiveness of Advertisements Presented on a Mobile Navigation Device."
Transaction History of related U.S. Appl. No. 11/844,321, filed Aug. 23, 2007, entitled "Rerouting in Vehicle Navigation Systems."
Transaction History of related U.S. Appl. No. 11/852,973, filed Sep. 10, 2007, entitled "Nearest Neighbor Geographic Search."
Transaction History of related U.S. Appl. No. 11/906,277, filed Oct. 1, 2007, entitled "Static and Dynamic Contours."
Transaction History of related U.S. Appl. No. 11/945,211, filed Nov. 26, 2007, entitled "System and Method of Providing Traffic Data to a Mobile Device."
Transaction History of related U.S. Appl. No. 11/967,889, filed Jan. 1, 2008, entitled "System and Method for Accessing a Navigation System."
Transaction History of related U.S. Appl. No. 12/013,384, filed Jan. 11, 2008, entitled "System and Method to Provide Navigational Assistance Using an Online Social Network."
Transaction History of related U.S. Appl. No. 12/016,949, filed Jan. 18, 2008, entitled "Method and Apparatus for Hybrid Routing Using Breadcrumb Paths."
Transaction History of related U.S. Appl. No. 12/016,980, filed Jan. 18, 2008, entitled "Method and Apparatus to Search for Local Parking."
Transaction History of related U.S. Appl. No. 12/016,982, filed Jan. 18, 2008, entitled "Method and Apparatus for Access Point Recording Using a Position Device."
Transaction History of related U.S. Appl. No. 12/188,139, filed Aug. 7, 2008, entitled "System and Method to Record a Present Trip."
Transaction History of related U.S. Appl. No. 12/192,018, filed Aug. 14, 2008, entitled "Route Navigation via a Proximity Point."
Transaction History of related U.S. Appl. No. 12/195,152, filed Aug. 20, 2008, entitled "Systems and Methods for Smart City Search."
PCT/US08/50760—International Search Report (mailed May 13, 2008).
PCT/US08/50760—Written Opinion (mailed May 13, 2008).
International Patent Application Serial No. PCT/US2009/030176, Written Opinion and International Search Report mailed Sep. 1, 2009.

USPTO Transaction History of related U.S. Appl. No. 08/691,663, filed Aug. 2, 1996, entitled "Method Providing A Textual Description of a Remote Vehicle Location," now U.S. Patent No. 6,141,621.
USPTO Transaction History of related U.S. Appl. No. 08/691,727, filed Aug. 2, 1996, entitled "System and Method for Controlling a Vehicle Emergency Response Network," now U.S. Patent No. 6,539,301.
USPTO Transaction History of related U.S. Appl. No. 08/710,473, filed Sep. 18, 1996, entitled "Navigation Simulator and Recorder," now U.S. Patent No. 5,922,041.
USPTO Transaction History of relatedd U.S. Appl. No. 08/713,625, filed Sep. 13, 1996, entitled "Navigation System With Vehicle Service Information," now U.S. Patent No. 5,819,201.
USPTO Transaction History of related U.S. Appl. No. 08/713,627, filed Sep. 13, 1996, entitled "Navigation System With User Definable Cost Values," now U.S. Patent No. 5,878,368.
USPTO Transaction History of related U.S. Appl. No. 08/762,012, filed Dec. 11, 1996, entitled "Navigation System With Forward Looking Origin Selection for Route Re-Calculation," now U.S. Patent No. 6,405,130.
USPTO Transaction History of related U.S. Appl. No. 09/037,772, filed Mar. 10, 1998, entitled "Navigation System Character Input Device," now U.S. Patent No. 6,037,942.
USPTO Transaction History of related U.S. Appl. No. 09/056,218, filed Apr. 7, 1998, entitled "Navigation System using Position Network for Map Matching," now U.S. Patent No. 6,108,603.
USPTO Transaction History of related U.S. Appl. No. 09/062,518, filed Apr. 17, 1998, entitled "3-Dimensional Intersection Display for Vehicle Navigation System," now U.S. Patent No. 6,611,753.
USPTO Transaction History of related U.S. Appl. No. 09/096,103, filed Jun. 11, 1998, entitled "Navigation System With a Route Exclusion List System," now U.S. Patent No. 6,362,751.
USPTO Transaction History of related U.S. Appl. No. 09/099,963, filed Jun. 19, 1998, entitled "Autoscaling of Recommended Route," now U.S. Patent No. 6,574,551.
USPTO Transaction History of related U.S. Appl. No. 09/100,683, filed Jun. 19, 1998, entitled "Navigation System Map Panning Directional Indicator," now U.S. Patent No. 6,175,801.
USPTO Transaction History of related U.S. Appl. No. 09/114,670, filed Jul. 13, 1998, entitled "Navigation System Vehicle Location Display," now U.S. Patent No. 6,049,755.
USPTO Transaction History of related U.S. Appl. No. 09/118,030, filed Jul. 17, 1998, entitled "Navigation System With Predetermined Indication of Next Maneuver," now U.S. Patent No. 6,078,684.
USPTO Transaction History of related U.S. Appl. No. 09/160,068, filed Sep. 24, 1998, entitled "Navigation System With Anti-Alias Map Display," now U.S. Patent No. 6,163,269.
USPTO Transaction History of related U.S. Appl. No. 09/176,630, filed Oct. 22, 1998, entitled "Street Identification for a Map Zoom of a Navigation System," now U.S. Patent No. 6,178,380.
USPTO Transaction History of related U.S. Appl. No. 09/239,692, filed Jan. 29, 1999, entitled "Vehicle Navigation System With Location Based Multi-Media Annotation," now U.S. Patent No. 6,360,167.
USPTO Transaction History of related U.S. Appl. No. 09/418,749, filed Oct. 15, 1999, entitled "Navigation System With Road Condition Sampling," now U.S. Patent No. 6,484,089.
USPTO Transaction History of related U.S. Appl. No. 09/435,381, filed Nov. 5, 1999, entitled "Navigation System Character Input Device," now U.S. Patent No. 6,765,554.
USPTO Transaction History of related U.S. Appl. No. 09/470,438, filed Dec. 22, 1999, entitled "Navigation System With All Character Support," now U.S. Patent No. 6,256,029.
USPTO Transaction History of related U.S. Appl. No. 09/470,441, filed Dec. 22, 1999, entitled "Navigation System With Unique Audio Tones for Maneuver Notification," now U.S. Patent No. 6,363,322.
USPTO Transaction History of related U.S. Appl. No. 09/487,654, filed Jan. 19, 2000, entitled "Navigation System With Route Indicators," now U.S. Patent No. 6,430,501.
USPTO Transaction History of related U.S. Appl. No. 09/519,143, filed Mar. 6, 2000, entitled "Navigation System With Complex Maneuver Instruction," now U.S. Patent No. 6,397,145.

USPTO Transaction History of related U.S. Appl. No. 09/535,733, filed Mar. 27, 2000, entitled "Selective Rendering of Cartographic Entities for Navigation System," now U.S. Patent No. 7,170,518.

USPTO Transaction History of related U.S. Appl. No. 09/547,004, filed Apr. 11, 2000, entitled "Navigation System With Zoomed Maneuver Instruction," now U.S. Patent No. 6,529,822.

USPTO Transaction History of related U.S. Appl. No. 09/661,982, filed Sep. 18, 2000, entitled "Points of Interest for Navigation System," now U.S. Patent No. 6,374,180.

USPTO Transaction History of related U.S. Appl. No. 09/679,671, filed Oct. 5, 2000, entitled "Navigation System With Run-Time Training Instruction," now abandoned.

USPTO Transaction History of related U.S. Appl. No. 09/691,531, filed Oct. 18, 2000, entitled "Multiple Configurations for a Vehicle Navigation System," now U.S. Patent No. 6,385,542.

USPTO Transaction History of related U.S. Appl. No. 09/799,876, filed Mar. 6, 2001, entitled "Navigation System With Figure of Merit Determination," now U.S. Patent No. 6,741,928.

USPTO Transaction History of related U.S. Appl. No. 10/088,017, filed Sep. 9, 2002, entitled "Navigation System With User Interface," now U.S. Patent No. 6,873,907.

USPTO Transaction History of related U.S. Appl. No. 10/208,261, filed Jul. 31, 2002, entitled "Displaying Data," now U.S. Patent No. 6,748,323.

USPTO Transaction History of related U.S. Appl. No. 10/619,619, filed Jul. 16, 2003, entitled "Intelligent Modular Navigation Information Capability," now U.S. Patent No. 7,233,860.

USPTO Transaction History of related U.S. Appl. No. 11/327,450, filed Jan. 9, 2006, entitled "Smart Detour."

USPTO Transaction History of related U.S. Appl. No. 11/518,205, filed Sep. 11, 2006, entitled "Method and System of Securing Content and Destination of Digital Download Via the Internet."

USPTO Transaction History of related U.S. Appl. No. 11/675,817, filed Feb. 16, 2007, entitled "A Method of Generating Curved Baseline for Map Labeling."

USPTO Transaction History of related U.S. Appl. No. 11/684,301, filed Mar. 9, 2007, entitled "Method and Apparatus for Determining a Route Having an Estimated Minimum Fuel Usage for a Vehicle."

USPTO Transaction History of related U.S. Appl. No. 11/740,280, filed Apr. 25, 2007, entitled "Adjusting Spatial Operations Based on Map Density."

USPTO Transaction History of related U.S. Appl. No. 11/840,610, filed Aug. 17, 2007, entitled "Methods and Apparatus for Measuring the Effectiveness of Advertisements Presented on a Mobile Navigation Device."

USPTO Transaction History of related U.S. Appl. No. 11/844,321, filed Aug. 23, 2007, entitled "Rerouting in Vehicle Navigation Systems."

USPTO Transaction History of related U.S. Appl. No. 11/852,973, filed Sep. 10, 2007, entitled "Nearest Neighbor Geographic Search."

USPTO Transaction History of related U.S. Appl. No. 11/906,277, filed Oct. 1, 2007, entitled "Static and Dynamic Contours."

USPTO Transaction History of related U.S. Appl. No. 11/945,211, filed Nov. 26, 2007, entitled "System and Method of Providing Traffic Data to a Mobile Device."

USPTO Transaction History of related U.S. Appl. No. 11/967,889, filed Jan. 1, 2008, entitled "System and Method for Accessing a Navigation System."

USPTO Transaction History of related U.S. Appl. No. 12/013,384, filed Jan. 11, 2008, entitled "System and Method to Provide Navigational Assistance Using an Online Social Network."

USPTO Transaction History of related U.S. Appl. No. 12/016,949, filed Jan. 18, 2008, entitled "Method and Apparatus for Hybrid Routing Using Breadcrumb Paths."

USPTO Transaction History of related U.S. Appl. No. 12/016,980, filed Jan. 18, 2008, entitled "Method and Apparatus to Search for Local Parking."

USPTO Transaction History of related U.S. Appl. No. 12/016,982, filed Jan. 18, 2008, entitled "Method and Apparatus for Access Point Recording Using a Position Device."

USPTO Transaction History of related U.S. Appl. No. 12/188,139, filed Aug. 7, 2008, entitled "System and Method to Record a Present Trip."

USPTO Transaction History of related U.S. Appl. No. 12/192,018, filed Aug. 14, 2008, entitled "Route Navigation via a Proximity Point."

USPTO Transaction History of related U.S. Appl. No. 12/195,152, filed Aug. 20, 2008, entitled "Systems and Methods for Smart City Search."

* cited by examiner

METHOD AND SYSTEM FOR NAVIGATION USING GPS VELOCITY VECTOR

FIELD OF THE INVENTION

The present invention relates generally to navigation services for a computing device, and more specifically to a method and apparatus for using a velocity vector derived from a GPS (Global Positioning System) signal and non-current Ephemeris or Almanac to perform navigation services.

BACKGROUND OF THE INVENTION

Global Navigation Satellite Systems (GNSS) allow navigation services including automatic route calculation from a current location to a destination location and guiding a driver of a vehicle to that destination with real time instructions in conjunction with a visual display of route segments as the vehicle progresses along the route.

Several different approaches for position location are known, including for example, terrestrial methods, GNSS methods, and hybrids of terrestrial and satellite-based methods. One such GNSS is the Global Positioning System (GPS), developed and operated by the U.S. Defense Department, which includes a constellation of at least 24 well-spaced satellites that orbit the earth at a distance of approximately 20,000 kilometers.

The satellites transmit GPS signals comprising very precise location parameters and timing signals that are received by wireless device processors allowing a processor to determine their respective three dimensional positions and velocities.

Each satellite transmits Almanac information, which includes information regarding the coarse location of all satellites in the constellation. Each satellite further transmits Ephemeris information, which includes a higher accuracy version of data pertaining to its own orbit, as tracked and reported by tracking stations on earth. At any one time, a GPS receiver receives Ephemeris for only those satellites currently being tracked. Not only are signals from different satellites acquired, tracked, and lost over a course of hours, Ephemeris transmitted from each satellite changes every hour to guarantee accurate approximation of the current orbital parameters.

One of the key parameters of a commercial GPS system is Time-To-First-Fix (TTFF). TTFF is defined as a time period from the moment a GPS unit is powered on to the moment it starts providing continuous position and velocity updates based upon the processing of signals received from the tracked GPS satellites. TTFF comprises two major parts, time-to-detect and acquire satellite signals and time-to-collect the Ephemeris. The signal acquisition is generally speeded up by using multi-channel receivers that can simultaneously search multiple frequencies.

Currently, GPS receivers can detect and lock onto the GPS satellite signal in a matter of a few seconds. However, the second part, collecting the GPS Ephemeris data, still takes about 30 seconds with a high signal-to-noise ratio (SNR), or an even longer period of time in the case of low SNR. This long processing time results in a user having to wait at least an extra 30 seconds before getting guidance instructions from a GPS navigation system. This wait time is often inconvenient for users who wish to know navigation instructions from the moment the navigation system is turned on.

Because the transmitted Ephemeris parameters provide accurate approximation of the true orbital parameters only for a limited time, Ephemeris information can only be used for 2-4 hours before it must be recollected from either the same or newly acquired satellites. Therefore, even for users who use their GPS navigation system every day and have latest collected Ephemeris for all tracked satellites stored in the non-volatile memory, if the GPS device was powered off for a few hours, data must be recollected and the users must wait more than 30 seconds for the device to process new Ephemeris information.

This problem has been partially resolved by the use of terrestrial systems that integrate wireless networks, i.e., cellular communication systems, and GPS satellites. GPS assisted systems rely upon terrestrial systems with base stations to collect Ephemeris and re-transmits the data via the cellular communication systems or other radio-link to the navigation device.

However, such GPS aided systems are not available in all locations, are not supported by many available GPS receivers, and are not toll free. Accordingly there is a need for apparatus and methods that allows users of non-GPS aided navigation systems to enjoy the full benefits of GPS guidance immediately after the GPS signal has been acquired, or when current Ephemeris is otherwise unavailable.

SUMMARY OF THE INVENTION

A GPS navigation device provides vehicular navigation features, e.g., routing, positioning, map-matching, and guidance based upon a GPS velocity vector derived from an acquired and tracked GPS signal and last stored Ephemeris or Almanac when current Ephemeris is unavailable. Positioning is based upon the principles of dead reckoning (DR), which is the process of estimating a position by advancing a known position, i.e., a startup location, using vehicle course, speed, and time.

One aspect of an apparatus and method of providing vehicle navigation features includes a computer platform comprising a global positioning system (GPS) receiver operable to acquire and track a GPS signal, a processor assembly, and a memory. The memory includes last recorded GPS information comprising at least one of Ephemeris and Almanac, and a GPS velocity vector determination module operable, based upon the tracked GPS signal and the last recorded GPS information, to determine a partial GPS solution comprising a velocity vector in the absence of current Ephemeris.

A further aspect of the present invention includes a method of vehicle navigation based on the above apparatus that may be used upon powering up of the navigation device prior to receiving, or in the absence of, current Ephemeris. The method comprises acquiring and tracking a GPS signal, retrieving from a memory a last recorded location of a vehicle, setting a dead reckoning startup location equal to the last recorded location, and retrieving from a memory one of a last recorded Ephemeris and Almanac. The method further comprises determining a velocity vector based upon the GPS signal and the last recorded Ephemeris or Almanac. Based upon the velocity vector and the dead reckoning startup location, the method determines a current location of the navigation device.

Yet another aspect includes a computer-readable medium embodying logic to perform the method described above.

Still another aspect includes a processor capable of executing the logic stored in the computer-readable medium of the above aspect.

Another aspect of the disclosed navigation device is operable to switch from a current Ephemeris based GPS solution for velocity and location to a DR solution when the last recorded Ephemeris is considered too old to allow accurate calculation of the velocity vector. Such a scenario may occur when a continuously powered navigation device is parked overnight in a parking structure, wherein the GPS receiver is unable to receive current Ephemeris, but is still able to acquire and track GPS signals. The method comprises continuously receiving GPS signals from tracked satellites. At the moment the last recorded Ephemeris becomes unavailable for use, the navigation device switches to a DR operational mode that sets a dead reckoning startup location equal to a last calculated GPS location, retrieves from a memory one of a last recorded Ephemeris and Almanac, determines a velocity vector based upon the GPS signal and the last recorded Ephemeris or Almanac, and then determines a current location based upon the velocity vector and the dead reckoning startup location.

BRIEF DESCRIPTION OF THE DRAWINGS

The present apparatus and methods are illustrated by way of example, and not by limitation, in the figures of the accompanying drawings, wherein elements having the same reference numeral designations represent like elements throughout and wherein.

DETAILED DESCRIPTION OF THE EXEMPLARY EMBODIMENTS

Figure 1:
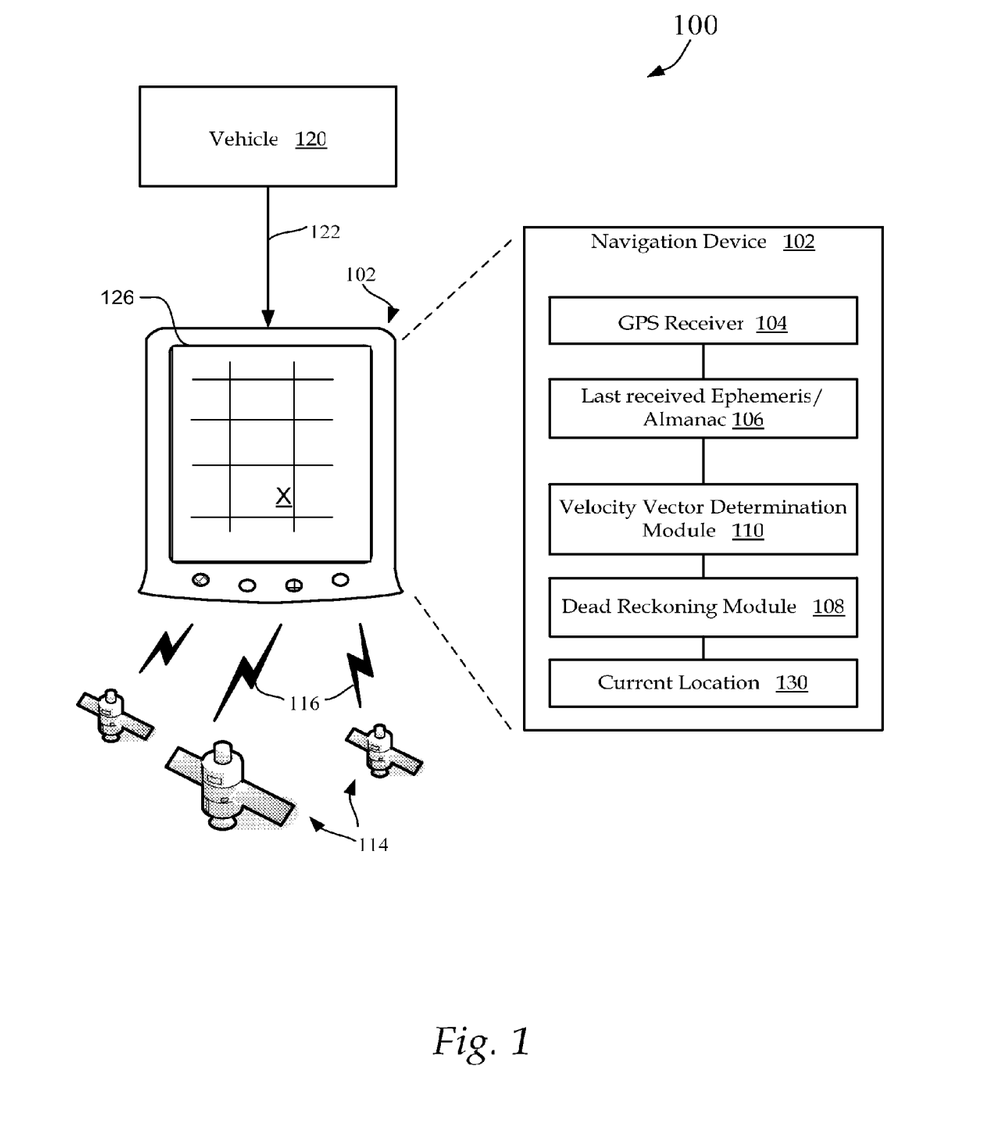
FIG. 1 is a system diagram of a GPS navigation system that includes a mobile end user device capable of providing navigation instructions upon acquisition of a GPS signal, according to the present invention.

FIG. 1 illustrates one embodiment of a GPS navigation system 100 that includes a vehicle mounted navigation device 102 that receives a GPS signal 116 containing GPS position location parameters from several satellites 114 orbiting the earth at a distance of approximately 20,000 kilometers. In some embodiments, the navigation device 102 derives continuous power from a vehicle connected cable 122. In other embodiments navigation device 102 is powered only when the vehicle's ignition is on.

Based upon the received parameters, navigation device 102 determines its respective three dimensional position and velocity using very precise location parameters and timing signals received from the satellites 114. upon determining a current location 130, navigation device 102 is operable to display a position of the vehicle 120 on a display device 126.

GPS vehicle position is normally derived from the pseudo-range measurements from three or more satellites, the pseudo-range measurements being time delays between the signal transmission from the satellite and the reception by receiver 104. "Pseudo" means that even though the transmission time can be measured in the receiver 104 accurately and unambiguously, the reception time is relative to the receiver internal clock. Because the clock offset is, usually unknown (until the receiver has calculated its position and corrected the clock), one extra pseudo-range measurement is needed to estimate and eliminate from the solution the clock error. Four satellites 114 are required for pseudo-ranges for the three dimension solution, or three satellites for the two dimension solution, when the receiver elevation is (assumed) known. After eliminating the clock offset, the distance from a satellite 114 to a receiver 104 is calculated, roughly as the measured delay multiplied by the speed of light.

To triangulate the receiver 104 position from 3-4 satellites one needs to know the exact satellite position at a given time. Moreover, unlike stationary beacons, the satellites own velocity has to be known as well. This information is contained in Ephemeris and Almanac data, comprising approximations of the satellite orbital parameters.

Ephemeris is transmitted continuously by the GPS satellites 114. Each satellite transmits its own Ephemeris. A non-changing set of values for Ephemeris parameters is usually transmitted continuously for 1-2 hours, and then changes to a new set of values to better approximate the current orbit. Once recorded, the Ephemeris would normally be usable for positioning purposes for approximately 2-4 hours.

In the open sky environment it takes on average 30 seconds to receive new Ephemeris, and it may take much longer with weak or interrupted signals, such as in a moving vehicle. Furthermore, although Ephemeris collection becomes virtually impossible below a signal-to-noise ratio (SNR level) of approximately 25-26 dbHz, satellite signal acquisition and tracking is still possible below this limit using currently available sensitive GPS receivers.

Almanac is transmitted by each satellite comprises data for all GPS satellites. It takes, on average, 19 minutes in the open sky area to collect new Almanac and the data is usable for weeks after collection, even though the Almanac parameters are updated usually twice a week.

The Ephemeris and Almanac received from the satellites 114 is stored in non-volatile memory in the navigation device 102 and is available after a recycling of power.

In addition to the information transmitted within the GPS signal 116, the changing characteristic of the received GPS signal itself (the Doppler frequency shift), by virtue of the changing position of the GPS receiver 104, is used to determine the velocity vector associated with the position of the GPS receiver 104.

One of the key parameters of a GPS system is Time-To-First-Fix (TTFF) and is defined as a time period from the moment when a GPS unit, i.e., navigation device 102, is powered on to the moment it can provide continuous position and velocity updates based upon the processing of signals received from the GPS satellites 114. TTFF comprises two major parts, time-to-detect and acquire satellite signals and time-to-collect the Ephemeris. Non-limiting, GPS receiver 104 is a multi-channel receiver that speeds up signal acquisition by simultaneously searching multiple frequencies for GPS signals 116.

GPS receiver 104 detects and locks onto, i.e., tracks, the GPS signal 116 in a matter of seconds after startup. However, the second part, decoding the Ephemeris data, takes about 30 seconds with strong received signals, or an even longer period of time in the case of low signal-to-noise ratio (SNR). This long processing time would normally result in a user having to wait at least an extra 30 seconds before getting guidance instructions.

During this startup period when current Ephemeris is unavailable, velocity vector determination module 110 is operable to calculate a GPS velocity vector, i.e., speed and heading, derived from the Doppler shift measurement of the received signal when compared to the known GPS signal frequency.

Using the output of the velocity vector determination module 110, DR module 108 is operable to use dead reckoning techniques to determine northern and eastern components of current location 130. Based upon the calculated velocity vector and the current location 130, a user receives navigation guidance information within a few seconds of turning on navigation device 102.

Figure 2:
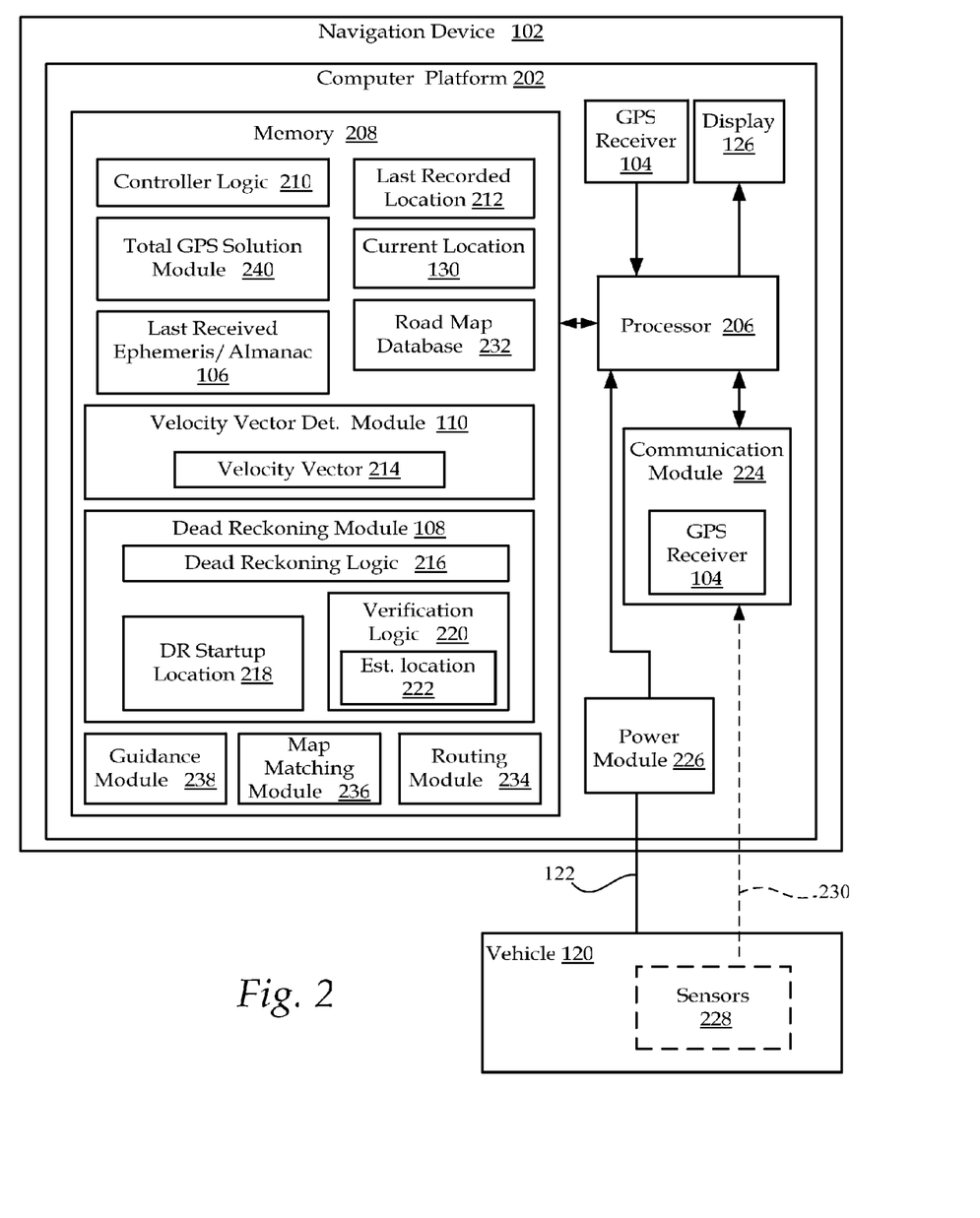
FIG. 2 illustrates a block diagram of a GPS navigation device, according to the system of FIG. 1.

FIG. 2 illustrates a more detailed block diagram of one embodiment of a vehicle mounted navigation device 102 with the capability to process signals from GNSS satellites (such as GPS satellites 114), WAAS (wide area augmentation system) satellites or other position location satellites). Non-limiting, navigation device 102 comprises a computer platform 202 operable to determine the location of the navigation device 102 and display its position X on a display 130 integrally or remotely connected to the device 102.

In some embodiments, the navigation device 102 is mounted under the dashboard of the vehicle 120. Display 126 may be integral to the navigation device 102, or in other embodiments, may be mounted to be visible to a driver of the vehicle 120 and is electrically connected to the navigation device 102. Map information displayed on the display 126 is based upon map data comprising road map database 232 residing on an internal memory device 208 or removable media, such as a compact disk (CD) and a secure digital (SD) card (not shown).

The navigation device 102 derives power from the electrical system of the vehicle 120 in which the navigation device is mounted. In some embodiments, cable 122 interconnects vehicle power to a power module 226 that distributes power to the components of the navigation device 102. In some embodiments processor module 206 and power module 226 is operable to initiate a dead reckoning process when startup occurs.

In some aspects, computer platform 202 includes a processor 206 for controlling the operation of the device 102 based upon one or more stored application program stored in a memory 208. Processor 206 may comprise an application-specific integrated circuit (ASIC), or other chipset, processor, microprocessor, logic circuit, or other data processing device operable to perform one or more processing functions for the end user device 102. Furthermore, processor 206 may include various processing subsystems, embodied in hardware, firmware, software, and combinations thereof, that enable the functionality of the end user device 102.

Processing unit 206 periodically instructs the GPS receiver unit 104 to acquire satellite signals and stores in memory 208 the Ephemeris/Almanac data received by receiver unit 104. Once Ephemeris/Almanac data 106 is received and stored, Total GPS Solution module 240 uses the current Ephemeris to accurately determine the location in a known manner. In the event of a power down and subsequent startup, velocity vector determination module 110 and dead reckoning module 108 use the last recorded Ephemeris/Almanac 106, the last recorded location 130, and the currently tracked GPS signal 116 to reduce the TTFF and provide navigation services until current Ephemeris is available.

Memory 208 includes any type of non-volatile memory, including read-only memory (ROM), random-access memory (RAM), EPROM, EEPROM, flash memory cells, secondary or tertiary storage devices, such as magnetic media, optical media, tape, or soft or hard disk, whether resident on computer platform 202 or remote therefrom. Controller logic 210 residing in memory 208 includes the program instructions operated upon by processor 206 to control all functions of the navigation device 102.

The computer platform 202 further includes a communication module 224 operable to transfer data between components of the portable end user device 102, such as between memory 208 and GPS receiver 104. Communication module 224 may include one or any combination of input and/or output ports, transmit and receive components, transceivers, antenna, etc, i.e., a wired or wireless universal serial bus (USB) port. Communication module 224 may include, but is not limited to, technologies such as a serial port, i.e., a universal serial bus (USB) port and a FIREWIRE serial bus interface; an infrared interface; and a short range radio frequency interface, such as a BLUETOOTH technology interface.

Furthermore, in some embodiments, communications module 224 receives, over a cable 230 or other communication means, velocity information 230 from vehicle sensors 228, such as inertia sensors, including, a yaw gyroscope, an accelerometer, a magnetometer, and/or information received from vehicle hardware or data bus, such as, odometer pulses or the anti-lock breaking system (ABS) wheel speed information. Although not required, such sensor generated data may aid in determining if navigation device 102 had been moved after a last shutdown and before a power-up.

In addition to dead reckoning, navigation device 102 comprises a map matching module 236 operable to determine a position X of the device 102 on a specific road segment and display this position X on display 126.

Furthermore, a routing module 234 is operable to determine a best route between a user current location and a user specified destination.

Further still, guidance module 238 is operable to provide the user with real time directions to a user specified destination.

In the absence of current Ephemeris, DR module 108, routing module 234, map matching module 236, and guidance module 238 all rely upon velocity vector 214 calculated using tracked GPS signals 116 in conjunction with last recorded Ephemeris/Almanac 106.

The navigation device 102 described herein comprises several operational modes, four of which are described below.

In a first operational mode power is being continuously supplied to the navigation device 102 through either a permanent connection or a temporary plug-in connection regardless of the run state of the vehicle. When current Ephemeris is available, the current location 130 is calculated using Total GPS Solution module 240 that receives and processes Ephemeris/Almanac sub frame information from GPS satellites 114 in a known manner. When current Ephemeris is unavailable, or if the received GPS signal 116 is too weak to extract Ephemeris but sufficient to acquire and track satellites 114, velocity vector determination module 110 is operable to calculate a velocity vector 214 used by navigation device 102 to provide services such as routing, positioning, map matching, and guidance. TTFF savings is not a factor because the system is never shut down.

For example, in the situation where a vehicle is parked overnight in an underground or multi-story garage, the received signals from GPS satellites 114 may be too weak to extract the new Ephemeris. As previously disclosed, a GPS satellite visibility interval from any given location usually does not exceed six hours. Therefore, in the case of a vehicle parked overnight, initially tracked satellites 114 would eventually be lost and new satellites 114 would have to be acquired. In a system not using dead reckoning, given the maximum Ephemeris age is no more than 2-4 hours, a newly acquired satellite signal without Ephemeris would be useless in determining velocity vector 214 and current location 130.

In the case of a vehicle parked overnight in an environment that precludes Ephemeris collection, DR module 108 is operable to maintain the up-to-date position of the using a weak GPS signal and non-current Ephemeris 106.

Furthermore, when vehicle 120 is started up the next morning, a continuously operating navigation device 102 does not require verification that the starting position is the same position as that when the engine was shut off.

However, random walk, i.e., position error due to velocity noise integrated over time, is possible. Vehicle sensors 228, when available, can obviate random walk errors by reliably indicating when the vehicle is not moving, for example when accelerometer information is close to zero. In such a situation, navigation device 102 would allow zeroing the velocity, freezing the dead reckoning position and avoiding dead reckoning growth over time. Furthermore, accelerometers are available that provide a motion interrupt that unless triggered, indicates that the vehicle is stopped.

A second operational mode occurs when navigation device 102 is permanently installed in a vehicle and is powered up after being shut down. In this mode, a savings in TTFF processing may be realized by using dead reckoning techniques. Velocity vector determination module 110 is operable to determine velocity vector 214 calculated from last recorded Ephemeris/Almanac 106 and acquired and tracked GPS signals 116. DR logic 216 sets a DR starting location 218 to the last recorded position 212 and uses the calculated velocity vector 214 to determine a current location 130 until such time as current Ephemeris is available.

A third operational mode occurs when navigation device 102 is a portable device capable of being transferred from one vehicle to another. In such a device, power may be supplied when the vehicle is running. Similar to the second mode, a savings in TTFF processing may be realized using dead reckoning until current Ephemeris is collected. Because this mode includes a portable navigation device 102, the device 102 may have been moved after having been shut down. If the navigation device 102 were moved from one vehicle to another during shutdown, the last recorded position 212 would be rendered useless, or at best, misleading. Accordingly, in this mode verification logic 220 is operable to calculate an estimated location 222 that is compared to the last recorded location 212 to determine whether the vehicle 120 has been moved from the last recorded location 212.

The GPS dead reckoning system 100 described herein is based upon the assumption that the position at startup is substantially the same as the last recorded position 212. Accordingly, navigation device 102 is preferably powered continuously in order to reliable determine its current location. However, because navigation device 102 may be shutdown when the vehicle 120 is not running (modes 2 and 3), power is applied to the navigation device 102 immediately after engine startup to minimize any difference between the vehicle's actual position and the last recorded position 212.

Although dead reckoning position error can be minimized, for example, by startup coincident with engine startup, some error may be unavoidable. For example, even were the navigation device 102 started up at the same time as the vehicle engine, GPS receiver 104 still requires a finite amount of time, e.g., 2-3 seconds, to acquire the GPS signal 116. Although it is conceivable that within these few seconds the vehicle changes its location, it is improbable that this distance would exceed more than few meters of travel sufficient to affect vehicle navigation in the time prior to receiving current Ephemeris data.

Furthermore, the position of navigation device 102 may have been changed during shutdown for other reasons, including, but not limited to device 102 being relocated to another device (mode 3), and the device 102 being turned off arbitrarily after the vehicle has already been driven from starting point (modes 2 or 3).

In some embodiments, verification logic 220 is operable to determine whether the device 102 has been moved during shutdown by checking the last recorded location 212 to determine if it is close to an estimated location 222 calculated from the pseudo-ranges and Doppler values using old Ephemeris or the Almanac. A second check is made to determine if an estimated speed of vehicle 120 (calculated using old Ephemeris or Almanac) is below a predetermined limit.

If the difference between the last recorded location 212 and the estimated location 222, does not exceed, for example, 0.5 miles, and the first speed value does not exceed 10 mph, verification logic 220 sets the DR startup location 218 to the last recorded location 212 allowing the navigation device 102 to perform navigation functions including, for example, dead reckon positioning, map matching, routing, and guidance.

If, however, the difference between the last recorded location 212 and the estimated location 222, or the estimated speed exceeds the predetermined limits, a DR startup location is unavailable until current Ephemeris is available and the total GPS solution (position and velocity) has been calculated by the Total GPS Solution Module 240.

Figure 3:
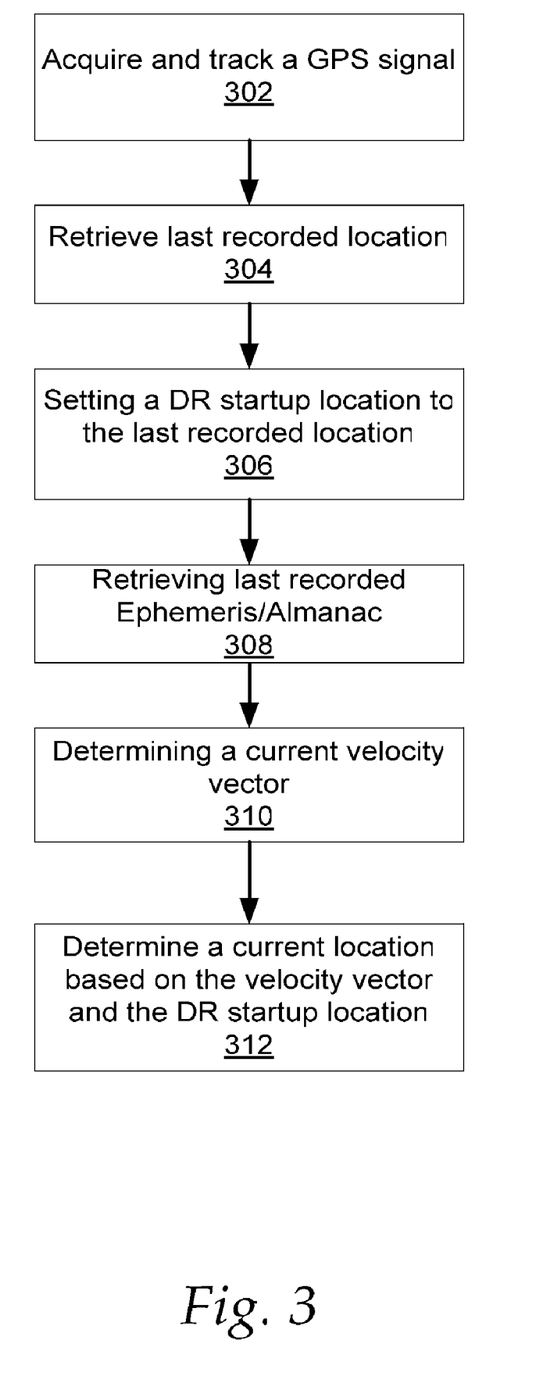
FIG. 3 illustrates one embodiment of a method to perform DR in the absence of current Ephemeris upon startup of the GPS navigation device, according to the system of FIG. 1.

FIG. 3 illustrates a flowchart of one embodiment of the GPS navigation device 102 that determines a current location of the device 102 upon startup of navigation device 102. In one scenario, a portable navigation device 102 mounted in a vehicle 120 is powered from, for example, the vehicle's cigarette lighter, which is many cases provides electric power to accessories only when the ignition is on.

Upon power-up at step 302, GPS receiver 104 begins to acquire and track GPS signals 116 from GPS satellites 114. In addition, processor 206 executing controller logic 210, executes DR module 108.

At step 304, processor 206 retrieves from memory 208 the last recorded location 212 of the navigation device 102.

At step 306, DR startup location 218 is set to the last recorded location 212. At step 308, the last recorded Ephemeris or Almanac information 106 is retrieved from memory 208 and is used in step 310 to determine a velocity vector 214.

The decision to use either Ephemeris or Almanac is based upon the age of the respective data and is explained in the discussion of FIGS. 4A, 4B, and 5 below.

In some embodiments, verification logic 220 is operable at step 306 to verify that the last recorded location 212 is sufficiently close to a calculated estimate 222 of the vehicle's location by measuring pseudo-ranges and Doppler values based upon the acquired GPS signals 116. If the difference between the estimated position 222 and the last recorded position 212 does not exceed a predetermined value, the last recorded position 212 is used to perform navigation functions. Otherwise, the user must wait until current Ephemeris is collected and processed.

After validation of the DR startup location 218 and selection of either the Ephemeris or Almanac, GPS velocity vector determination module 110 determines, at step 310, a velocity vector 214 that includes speed and heading of the navigation device 102. Algorithms that velocity vector 214 using GPS or other radio beacons based upon Doppler shift and other technologies are known to those in the field of navigation.

After determination of the velocity vector 214 and based upon the DR startup location 218, the DR module 108 determines, at step 312, the current location 130 using known dead reckoning techniques and stores the current location 130 in memory 208.

In other embodiments wherein inputs from external vehicle sensors 228 are available, increased accuracy in speed and heading may be available by receiving input from a turn rate sensor including one or more gyros that operate in a known manner to detect turning and by using odometer pulses to determine vehicle speed. Accordingly, at step 310, external sensors 228 may be incorporated to provide additional velocity information to improve the accuracy of the computed current location 130.

Once the current location 130 is determined, controller logic 210 is operable to display the position X of the vehicle 120 on display 130 based upon map information provided by map matching module 236 and road map database 232.

Figure 4:
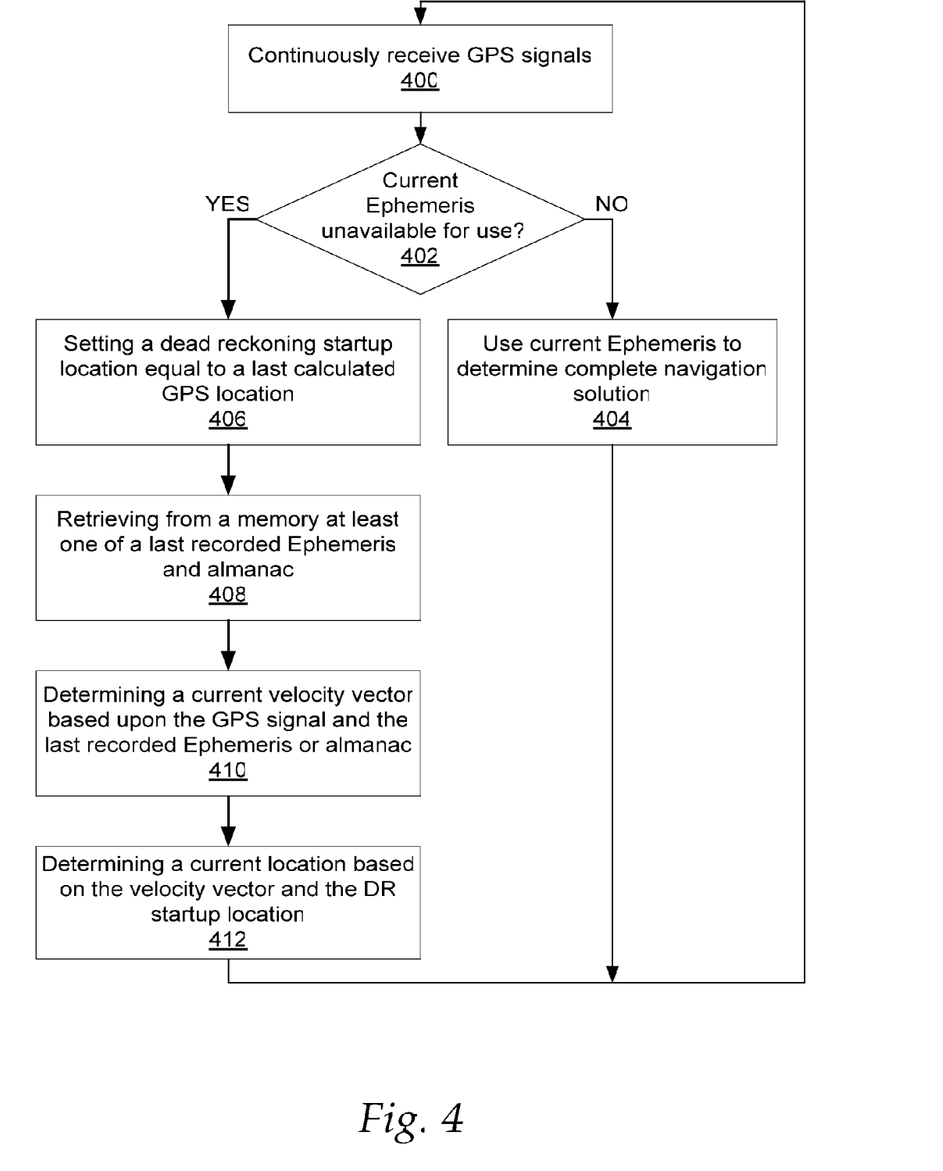
FIG. 4 illustrates another embodiment of a method to perform DR in the absence of current Ephemeris in a continuously powered GPS navigation device, according to the system of FIG. 1.

FIG. 4 illustrates a method by which a navigation device 102 is operable to switch from a mode of operation that uses Total GPS Solution module 240 that calculates the current location 130 based upon current Ephemeris, to a mode of operation that uses GPS velocity vector determination module 110 and DR module 108 to derive a velocity vector 214 and current location 130. The output of modules 108 and 110 allow the navigation device 102 to perform navigation functions whenever Ephemeris for the satellites currently being tracked becomes too old for the Total GPS Solution module 240. Such a scenario exists when a vehicle 120, equipped with a continuously powered navigation device 102 is parked overnight in a parking structure that attenuates the GPS signal, blocking reception of current Ephemeris, but still allowing GPS satellite signal tracking.

At step 400, navigation device 102 continuously receives GPS signals 116. Until the moment that the last received Ephemeris 106 becomes unavailable to derive a total GPS solution, i.e., location and velocity, the navigation device 102, at step 404, continues to use last recorded Ephemeris to derive velocity vector 214 and current location 130. Depending upon satellite position, this moment may occur approximately 6 hours after the last Ephemeris is received.

Once the controller logic 210 determines that the last recorded Ephemeris is too old, the navigation device 102 switches to dead reckoning in order to perform navigation functions.

At step 406, DR module 108 sets the DR startup location 218 to the last calculated GPS location 212. Unlike the non-continuously powered embodiment disclosed in the flowchart of FIG. 3, if the device 102 is continuously powered, it is unnecessary to verify a DR startup location or to retrieve a last recorded position 212 from memory 208.

Accordingly at step 408, controller logic 210 retrieves from memory 208 either the last recorded Ephemeris or Almanac, based upon the age of the data, as discussed in step 308 of FIG. 3.

At step 410, velocity vector determination module 110 calculates the velocity vector 214 based upon the tracked GPS signal 116 and the last recorded Ephemeris/Almanac 106.

At step 412, the DR module 108 calculates current location 130 based upon velocity vector 214 and DR startup location 218.

After calculation of current location 236, controller logic 210 is operable to project the position X of the device 102 on display 126 in conjunction with stored map data from road map database 232.

As previously disclosed, positioning using dead reckoning is but one use of a velocity vector 214 derived from the GPS signal 116 in the absence of current Ephemeris. Other aspects of navigation device 102 that may utilize velocity vector 214 include map matching, routing, and guidance.

A map matching process, performed by map matching module 236, is operable to determine the position of the device 102 on a specific road segment based upon a road map database 232. In addition to information obtained from road map database 232, map matching module 236 uses information regarding the vehicle's current and past coordinates, speed, and heading. For example, map matching module 236 compares the vehicle current location 130, velocity vector 214, position history (trajectory) and the speed and heading history to road segments location and direction, intersection location, speed limits, etc, to find the most reliable projection X of the position of the vehicle 120, onto the road, or off road network.

In some embodiments, the guidance module 238 outputs commands, e.g., visual and/or audible, to the user, for example, "turn left at the next intersection," relative to road map database 232.

FIGS. 4A and 4B are graphs illustrating Doppler errors computed in a one week long test using old Ephemeris and Almanac, respectively, as a function of the age of the Ephemeris/Almanac. Horizontal velocity vector error, recorded as the number of Doppler error, i.e., horizontal dilution of precision (HDOP), will usually be in the range 1-3 in open area, depending upon the number of tracked satellites.

Figure 5A:
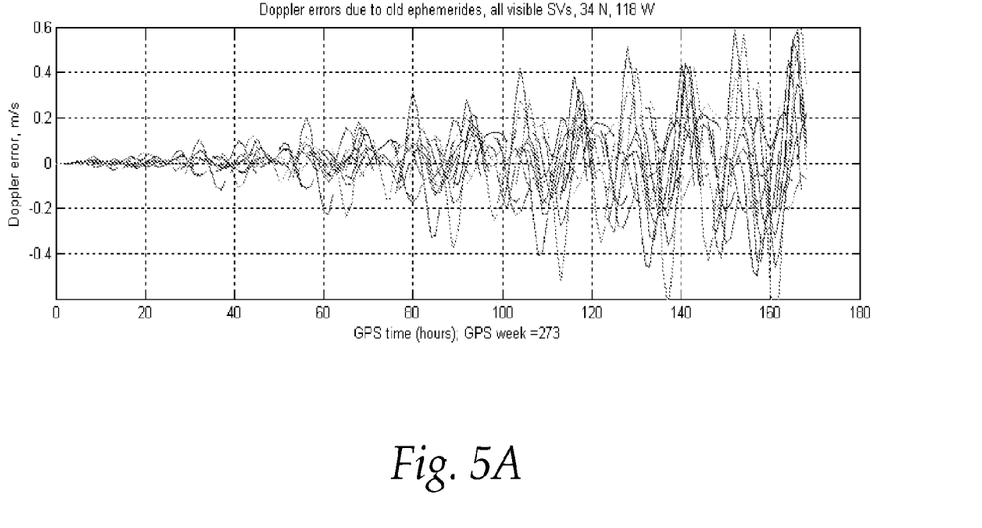
FIGS. 5A and 5B illustrate Doppler error of Ephemeris and Almanac, respectively, as a function of age.
Figure 5B:
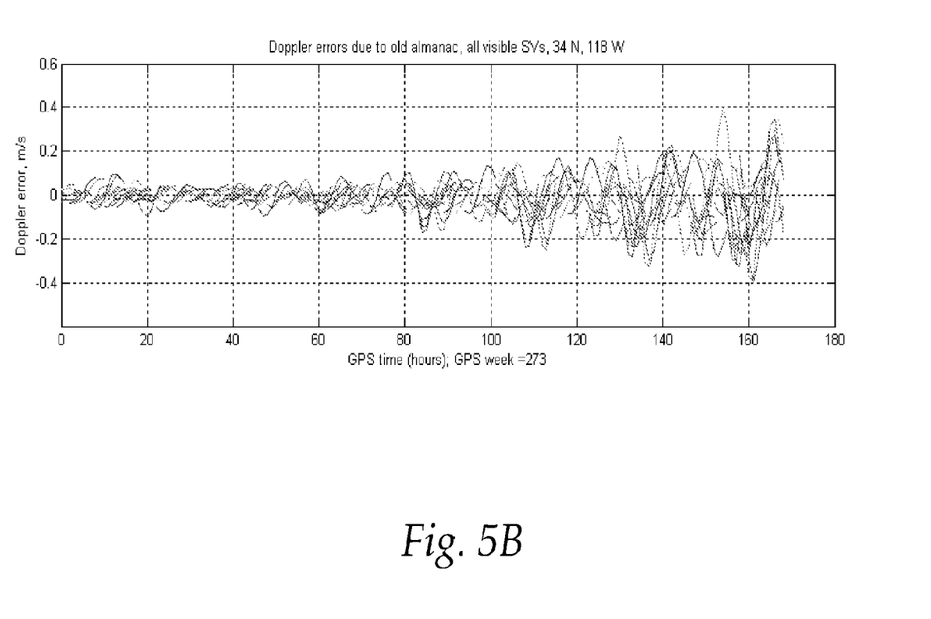
Figure 6:
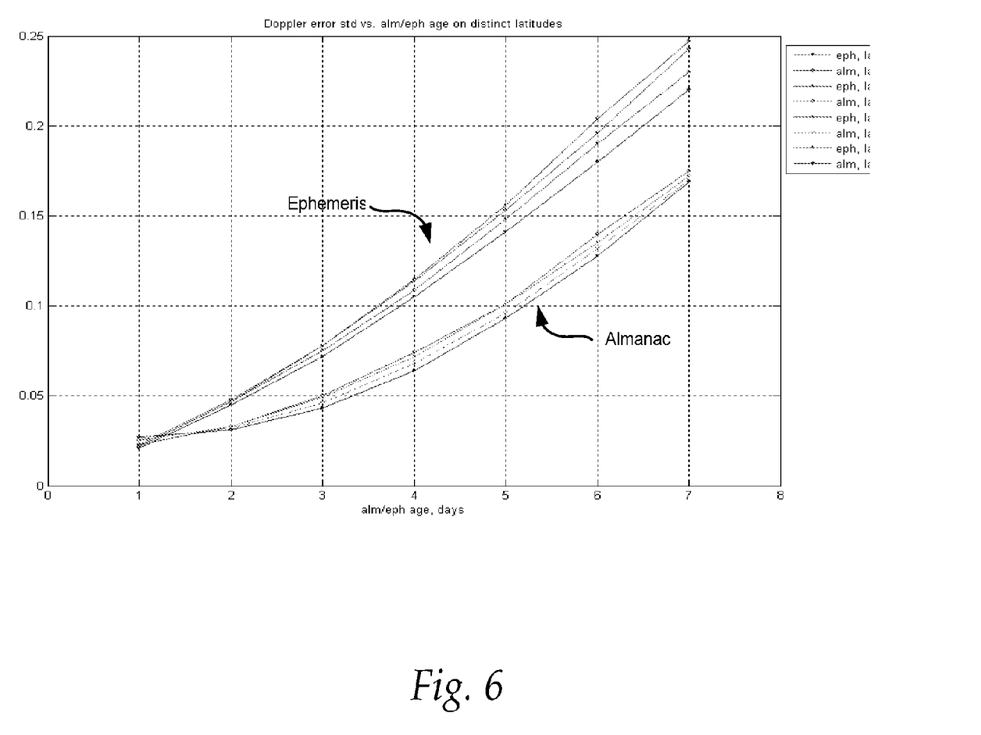
FIG. 6 illustrates average standard deviation of Doppler errors of Ephemeris and Almanac as a function of age.

FIG. 5 illustrates average standard deviation of Doppler errors as a function of the Ephemeris age (top cluster) and Almanac age (bottom cluster). Based upon the data depicted in FIGS. 4A, 4B, and 5, one embodiment of navigation device 102 selects Ephemeris or Almanac location data based upon the age of the data, using Ephemeris as a first choice, if the age of the last recorded location information is under a predetermined number of days, for example, under 1-1.5 days, and uses the Almanac if the age of the data is greater than 1.5 days up until a predetermined maximum number of days. Alternatively, navigation device 102 may be programmed to only use one type of location data or may be programmed based upon other observable characteristics of the Ephemeris and/or Almanac data.

While the foregoing disclosure shows illustrative aspects and/or aspects, it should be noted that various changes and modifications could be made herein without departing from the scope of the described aspects and/or aspects as defined by the appended claims. Furthermore, although elements of the described aspects s described or claimed in the singular, the plural is contemplated unless limitation to the singular is explicitly stated. Additionally, all or a portion of any aspect and/or aspects may be utilized with all or a portion of any other aspect and/or aspect, unless stated otherwise.

What is claimed is:

1. A vehicle navigation device includes a computer platform comprising:
   a global positioning system (GPS) receiver operable to acquire and track a GPS signal;
   a processor assembly; and
   a memory, wherein the memory includes:
      last recorded GPS information comprising at least one of Ephemeris information and Almanac information;
      a GPS velocity vector determination module operable to output a velocity vector in the absence of current Ephemeris based upon the tracked GPS signal and the last recorded GPS information; and
      a dead reckoning module operable to determine a current location of the navigation device based on the determined velocity vector and a dead reckoning startup location, comprising:
         a verification logic for determining an estimated position calculated from pseudo-ranges and Doppler values using the last recorded GPS information, then comparing the estimated position against a last recorded location, and using the last recorded location as the dead reckoning position if a difference between the estimated position and the last recorded location does not exceed a predetermined value.

2. The navigation device as recited in claim 1, further comprising map matching, routing, and guidance modules receiving as inputs, components of the velocity vector and the current location.

3. A method of vehicle navigation in the absence of current Ephemeris, the method comprising a navigation device performing the steps of:
    acquiring and tracking a GPS signal;
    retrieving from a memory a last recorded location of a vehicle;
    retrieving from the memory at least one of a last recorded Ephemeris and Almanac;
    comparing the last recorded location against an estimated position calculated from the last recorded Ephemeris or Almanac;
    setting a dead reckoning startup location equal to the last recorded location if a difference between the estimated position and the last recorded location does not exceed a predetermined value;
    determining a current velocity vector based upon the GPS signal and the last recorded Ephemeris or Almanac; and
    determining a current position based upon the velocity vector and the dead reckoning startup location.

4. The method of claim 3, further comprising:
    measuring pseudo-ranges and Doppler values based upon the acquired GPS signals to generate the estimated position.

5. The method of claim 3, wherein determining a current velocity vector comprises selecting one of last recorded Ephemeris and Almanac based upon an age of the Ephemeris and Almanac.

6. The method of claim 3, wherein determining the dead reckoning startup location includes combining vehicle sensor information with the last recorded location information.

7. The method of claim 3, wherein determining a current velocity vector further comprises utilizing vehicle sensor information in addition to the GPS signal and the last recorded Ephemeris or Almanac.

8. At least one processor configured to perform the actions of:
    acquiring and tracking a GPS signal;
    retrieving from a memory a last recorded location of a vehicle;
    retrieving from the memory at least one of a last recorded Ephemeris and Almanac;
    comparing the last recorded location with an estimated position calculated from the last recorded Ephemeris or Almanac;
    setting a dead reckoning startup location equal to the last recorded location if a difference between the estimated position and the last recorded location does not exceed a predetermined value;
    determining a current velocity vector based upon the GPS signal and the last recorded Ephemeris or Almanac; and
    determining a current location using the velocity vector and the dead reckoning startup location.

9. A machine-readable medium comprising executable instructions stored thereon, comprising:
    a first set of instructions for acquiring and tracking a GPS signal;
    a second set of instructions for retrieving from a memory a last recorded location of a vehicle;
    a fourth set of instructions for retrieving from the memory at least one of a last recorded Ephemeris and Almanac;
    a fifth set of instructions for determining a current velocity vector based upon the GPS signal and the last recorded Ephemeris or Almanac;
    a sixth set of instructions for determining a current location using dead reckoning, based upon the velocity vector and a dead reckoning startup location;
    a seventh set of instructions for comparing the last recorded location against an estimated position calculated from the last recorded Ephemeris or Almanac; and
    a third set of instructions for setting the dead reckoning startup location equal to the last recorded location if a difference between the estimated position and the last recorded location does not exceed a predetermined value.

10. A method of vehicle navigation in the absence of current Ephemeris, comprising:
    continuously receiving GPS signals from tracked satellites;
    switching to a dead reckoning mode when the last recorded Ephemeris becomes unusable, wherein switching to a dead reckoning mode includes:
    retrieving from a memory at least one of a last recorded Ephemeris and Almanac;
    comparing a last calculated GPS location against an estimated position calculated using the last recorded Ephemeris or Almanac;
    setting a dead reckoning startup location equal to the last calculated GPS location if a difference between the estimated position and the last calculated GPS location does not exceed a predetermined value;
    determining a current velocity vector based upon the GPS signal and the last recorded Ephemeris or Almanac; and
    determining a current location based upon the velocity vector and the dead reckoning startup location.

* * * * *